United States Patent [19]

Mehn

[11] 3,951,105

[45] Apr. 20, 1976

[54] ANIMAL CAGE LID
[75] Inventor: Robert P. Mehn, Cleveland, Wis.
[73] Assignee: IPCO Hospital Supply Corporation, White Plains, N.Y.
[22] Filed: Jan. 9, 1974
[21] Appl. No.: 431,894

[52] U.S. Cl. .................................................. 119/18
[51] Int. Cl.² ........................................... A01K 31/00
[58] Field of Search ................................. 119/18, 17

[56] References Cited
UNITED STATES PATENTS
3,381,665  5/1968  Naturale ............................... 119/18
3,572,293  3/1971  Schroen ............................... 119/18

*Primary Examiner*—Louis G. Mancene
*Assistant Examiner*—Peter K. Skiff
*Attorney, Agent, or Firm*—Holland, Armstrong, Wilkie & Previto

[57] ABSTRACT

A stackable cage lid with a partition which is foldable from an upright to a prone position.

11 Claims, 4 Drawing Figures

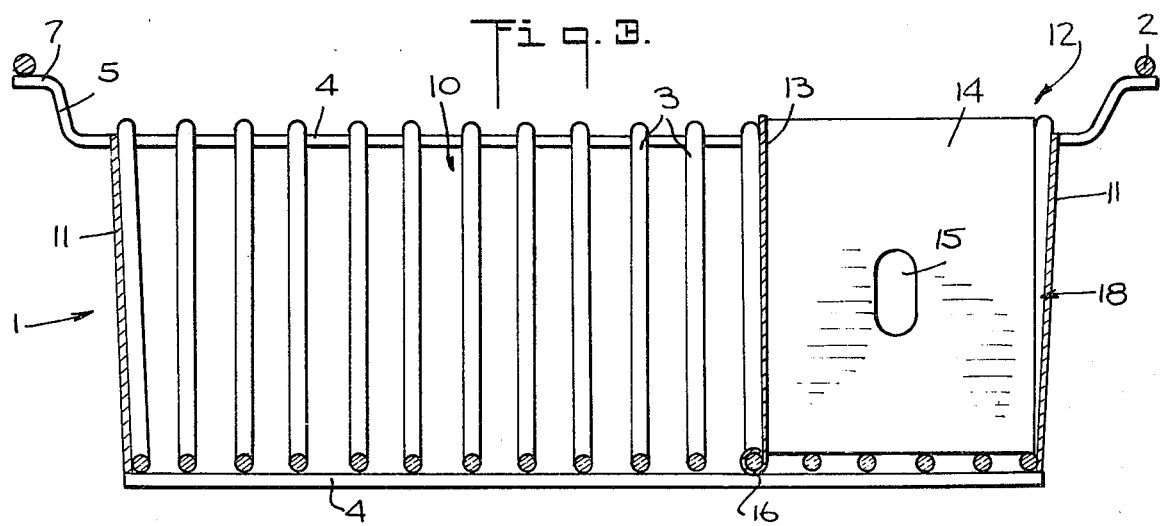
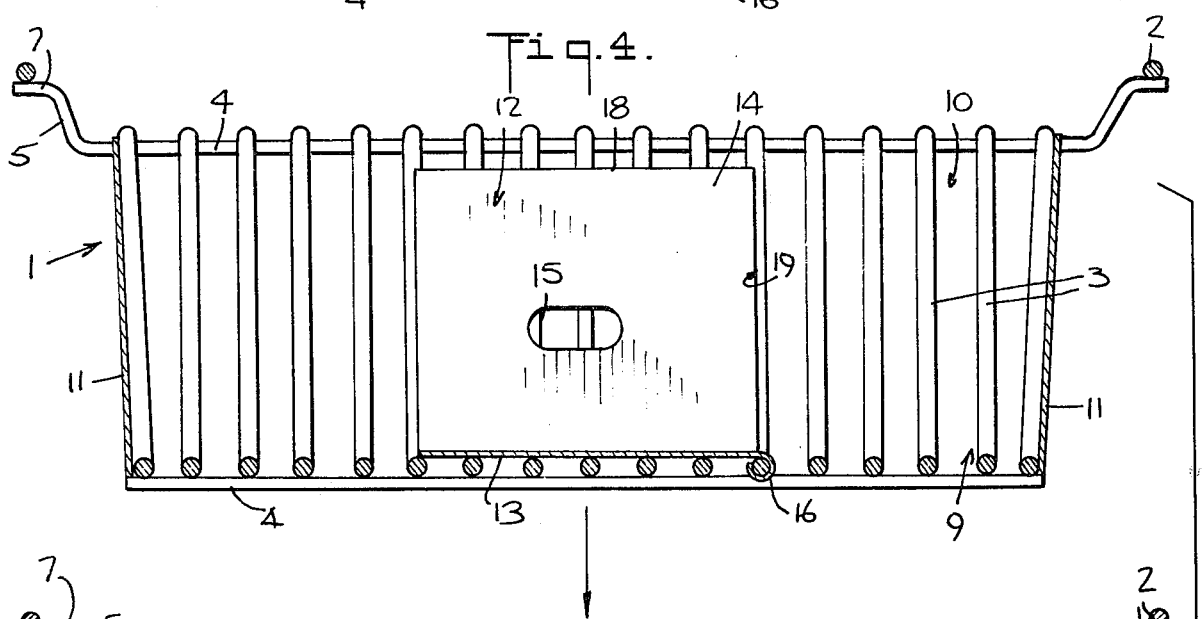
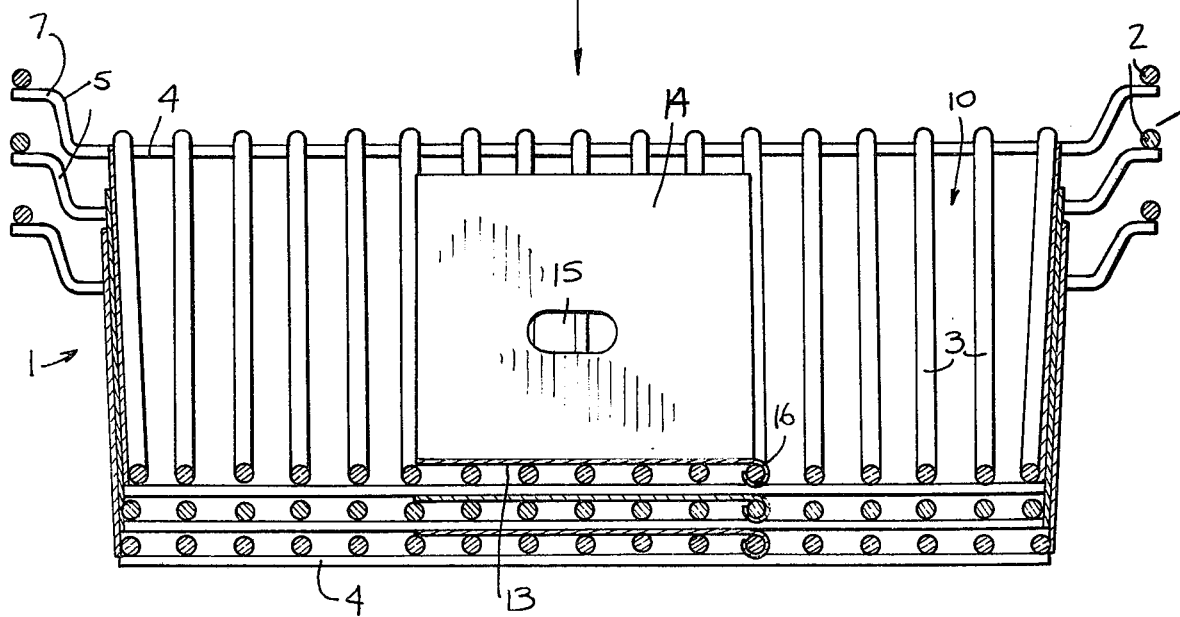

ANIMAL CAGE LID

DESCRIPTION

The present invention is directed to an animal cage lid and more particularly to an improved lid which may be stacked with others of its kind.

Heretofore animal cage lids of the type having a depressed feed trough portion have been fitted with a separator to separate the trough into a bottle-receiving compartment and a feed-receiving compartment. Such a separator has been permanently fixed axially of the cage lid and has therefore prevented any provision for stacking during shipment and storage since the fixed separator prevents effective stacking.

The present invention overcomes this stacking problem by providing a separator which may be moved or folded out of the way to enable the lids to be stacked one within another without any obstruction from the separator member.

This is an improvement over U.S. Pat. No. 3,381,665 which shows a cage lid having a partition that is foldable.

The present invention has for one of its objects the provision of an improved cage lid which is easily stackable.

Another object of the present invention is the provision of an improved cage lid in which the feed trough separator may be easily folded down.

Another object of the present invention is the provision of an improved cage lid in which the feed trough separator may be easily moved down.

Another object of the present invention is the provision of an improved cage lid in which the feed trough separator may be easily placed in an upright position and maintained there.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 3 is an elevational view of the cage lid with the separator in the upright position;

FIG. 4 is an elevational view of the cage lid with the separator in the down position and showing the manner in which the cage lids may be stacked.

Figure 1:
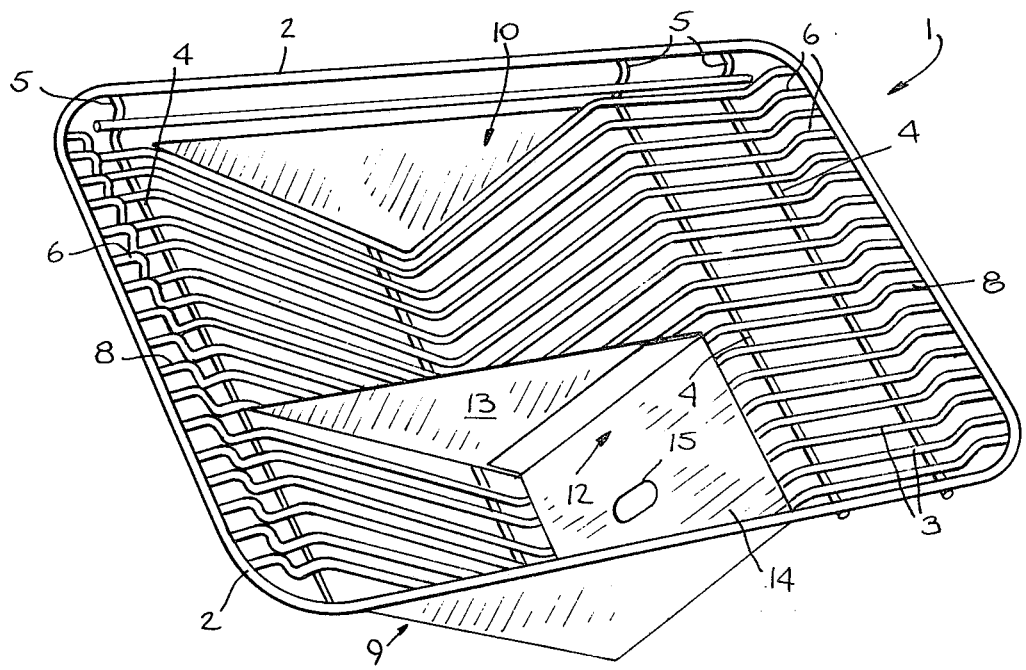
FIG. 1 is a perspective view of the invention.

Referring particularly to the embodiment shown in FIGS. 1 to 4, the animal cage lid 1 comprises a thick outer rectangular wire frame 2 and a plurality of substantially parallel longitudinal thin wires 3. A plurality of thin transversely disposed reinforcing wires 4 are also provided forming a mesh. Both the reinforcing wires 4 and the axial wires 3 have step down portions 5 and 6 adjacent frame 2 which provide flanges 7 and 8 to permit the lid to be mounted on a cage.

The longitudinal wires 3 have a substantially downwardly angled portion 9 to provide a feed trough 10. The sides of the feed trough 10 are closed off by a pair of side walls 11.

The separator unit 12 of the present invention is adapted to be pivotly mounted on one of the wires 3 in the trough 10 as shown in the drawings. It comprises a side wall 13 in longitudinal orientation with the cage lid and a front wall 14 extending at right angles thereto. The front wall 14 has an opening 15 adapted to permit the nipple of a bottle to extend therethrough for the animal to drink. The side wall 13 has sleeves 16 around one of the wires 3 in the trough 10 to permit it to pivot.

It will be seen that in the upright position with the bottle in place, the separator is held in the upright position without any extraneous use of wires, snaps, etc. However, after the bottle is removed, the partition can be folded as shown in FIG. 4 and the cage can be stacked one on top of each other.

The separator unit 12 is adapted to pivot by means of a sleeve 16 on one of the wires 3 in the trough 10 as will be seen. In the upright position the lower edges 19 of the front wall 14 abuts the other wires 3 so that the separator unit 12 remains in an upright position. With the nipple of a bottle extending through adjacent wires 3 and through the opening 15 of the separator unit 12 is locked in the upright position.

While in the drawings, the width of the front wall 14 of the separator unit 12 is shown as being wide enough so that the side edge 18 of the front wall 12 contacts the end wall 11 when in the upright position, it will be understood that this is not essential as the separator unit 12 may be pivoted along any wire 3 depending on how large the bottle area or the solid food area of the feed trough is desired.

Figure 2:
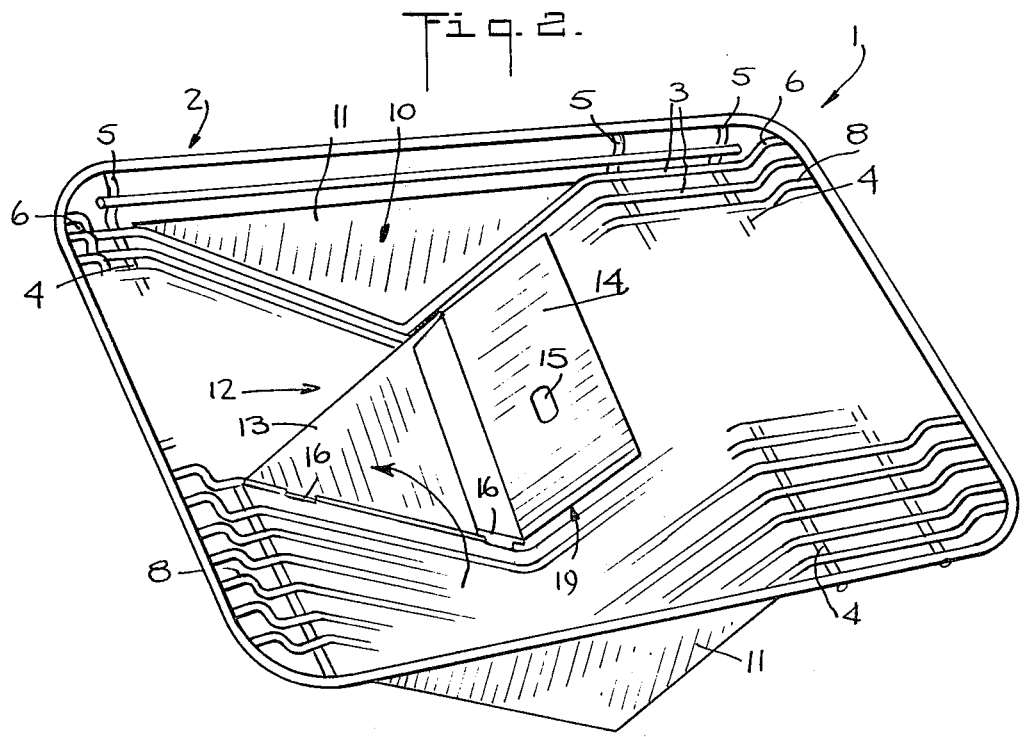
FIG. 2 is a perspective view of the animal cage lid with the separator in the down position.

When it is desired to stack the cage lids on top of each other, the bottle is removed from the opening 15 and the wall is folded down around the pivot 16 as shown in FIGS. 2 and 4. Preferably, the width of the front wall 14 when in the folded down position is such that the side edge 18 does not extend above the top edge of the cage lid so that the cage lids may be stacked one on top of the other without interference from the front wall 12.

It will be seen that the present invention provides an improved animal cage lid with a feed trough in which the separator member may be moved down into inoperative position so as to permit it and similar animal cage lids to be stacked on top of each other. This effects a savings in space and in shipping costs.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described the invention, it is claimed:

1. An animal cage lid having a top portion and a portion extending below the level of the top portion to form a food trough, the said food trough having a front wall and a bottom wall, a separator unit pivotly mounted in said trough for separating the trough into two sections, said separator unit being pivotly mounted on the bottom wall of said trough and movable from the upright position to a prone position and support means extending transversely from the separator unit and having a portion adapted to abut the said bottom wall of the trough for holding said separator in its upright position.

2. An animal cage lid as claimed in claim 1 wherein said feed trough comprises a plurality of spaced longitudinal wires and said separator unit is pivotly mounted on one of said wires.

3. An animal cage lid as claimed in claim 2 wherein said separator unit comprises a partition and wherein said lower part of said partition is pivotly mounted on said wire.

4. An animal cage lid as claimed in claim 3 wherein said support means comprises a front wall extending from the partition.

5. An animal cage lid as claimed in claim 4 wherein said front wall extends at right angles to said partition.

6. An animal cage lid as claimed in claim 5 wherein said front wall has a lower edge adapted to abut the trough when the separator unit is in the upright position.

7. An animal cage lid as claimed in claim 6 wherein the width of the front wall is such that the partition does not extend above the depth of the trough when the partition is in the folded position.

8. An animal cage lid as claimed in claim 7 wherein the edge of the front wall opposite the partition abuts the edge of the trough when the partition is in the upright position.

9. An animal cage lid as claimed in claim 8 wherein said front wall has an opening therein.

10. An animal cage lid as claimed in claim 9 wherein the opening in said front wall is in alignment within the spaces between the adjacent wires in said trough.

11. An animal cage lid as claimed in claim 10, wherein said trough comprises a front portion and wherein the front wall of the separator is substantially parallel to the said front portion of the trough.

* * * * *